United States Patent [19]

Dambacher

[11] Patent Number: 5,430,492
[45] Date of Patent: Jul. 4, 1995

[54] METHOD OF TRANSMITTING DIGITAL HDTV SIGNALS

[75] Inventor: Paul Dambacher, Ampfing, Germany

[73] Assignee: Rohde & Schwartz GmbH & Co. KG, Munich, Germany

[21] Appl. No.: 881,769

[22] Filed: May 12, 1992

[30] Foreign Application Priority Data

Aug. 2, 1991 [DE] Germany .................. 41 25 606.9

[51] Int. Cl.⁶ ..................... H04N 5/222; H04N 5/38
[52] U.S. Cl. ..................... 348/469; 348/487; 348/723; 370/20
[58] Field of Search ............. 358/186, 185; 455/103; 370/20, 19, 37, 75; 348/469, 487, 723, 484

[56] References Cited

PUBLICATIONS

Zauberwort Multimedia—Mar., 1991.
Herbert Hofmann, "Digitale Bildcodierung Fur Zuspielung Und Rundfunkubertragung Von TV-Signalen", Feb. 4, 1991.

Primary Examiner—John K. Peng
Attorney, Agent, or Firm—Hill, Steadman & Simpson

[57] ABSTRACT

For transmitting digital HDTV signals, the HDTV signal, which is either fed with a data rate of ≦20.48 Mbit/s or which is data-reduced to such a data rate of ≦20.48 Mbit/s by means of a method utilizing the psycho-optical phenomena of the human eye, is split at the transmitter side of a broadband transmission link operating on the DSR method into two data streams of ≦10.24 Mbit/s each, and is fed to the I/Q interface of the 4PSK modulator of the DSR transmission link. These two data streams whch are transmitted to the I/Q output of the 4PSK demodulator of the DSR transmission link are then further processed thereat.

8 Claims, 3 Drawing Sheets

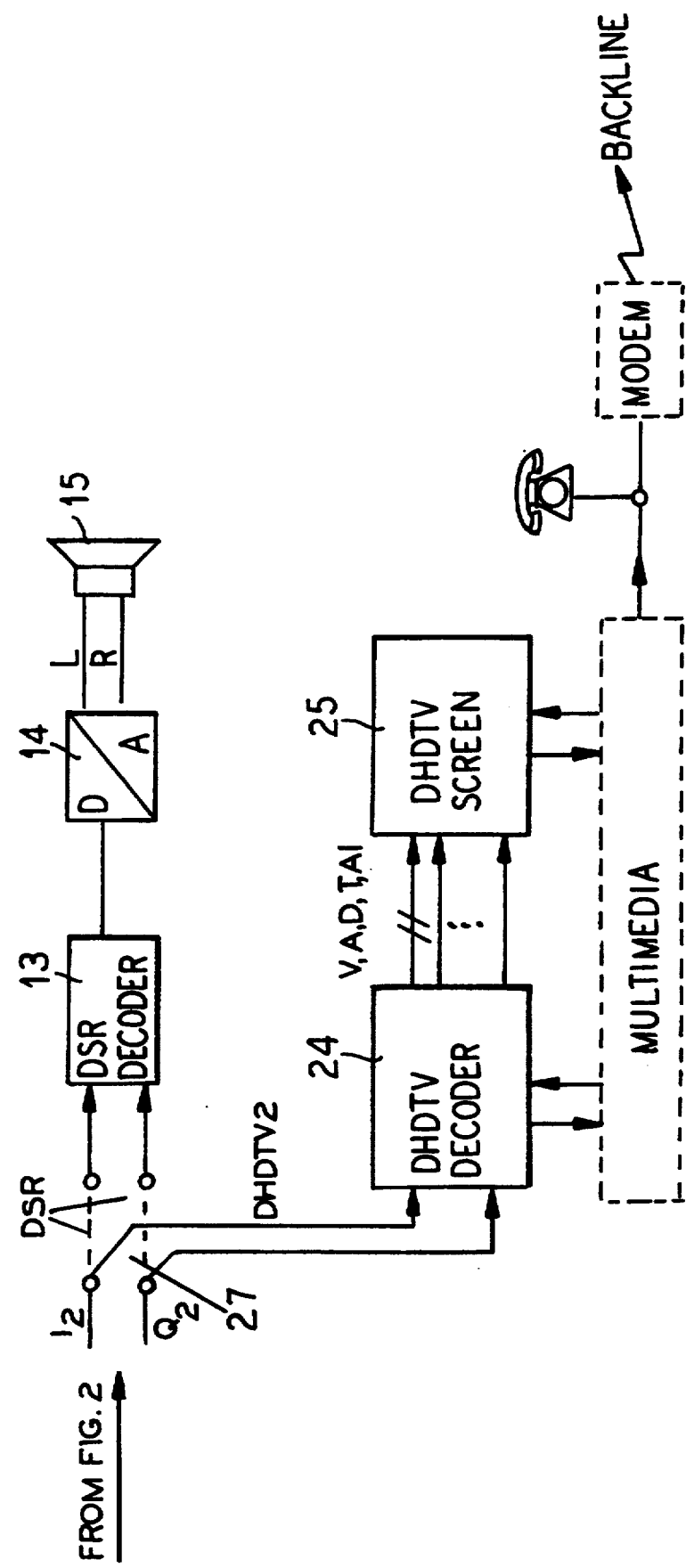

METHOD OF TRANSMITTING DIGITAL HDTV SIGNALS

FIELD OF THE INVENTION

The present invention is directed to a method of transmitting digital HDTV signals via broadband communication links.

DESCRIPTION OF THE PRIOR ART

In addition to the usual analog transmission techniques for TV signals in accordance with PAL PLUS, D2MAC, MAC with 16:9 picture format, HDMAC and HDTV 50/60 Hz, there already exist a number of digital transmission techniques. These digital transmission techniques offer the advantage of requiring only reduced bandwidth and a smaller C/N ratio. A drawback of digital TV signals is their high bit rate. Even the coding standard for the digitization of TV signals with reference to PAL quality (4:2:2 studio standard in accordance with CCR Recommendation 601; H. Hofmann IRT "Verteilung digitaler Bildsignale im Fernsehstudio", Fernseh- und Kinotechnik No. 11/84) still results in digital TV signals with a bit rate of 216 Mbit/s, and for high-quality TV signals, so-called HDTV signals (High Definition TeleVision) such as HDMAC or HDTV, respectively, there result even higher bit rates of up to 1 Gbit/s. Thus, there already exist various proposals for data reduction of such digital TV signals, all of these proposals operating on the basis of base-band coding with data reduction by utilizing the psycho-optical phenomena of the human eye similar to the MUSICAM data reduction technique for broadcasting which utilizes the psycho-acoustic phenomena of the human ear. In accordance with this technique it is possible even for digital TV signals of HD quality, i.e. for TV signals with a 16:9 picture format and high-definition line structures with 1000 or more lines (digital HDTV signals) to reduce the data rate to less than 20 Mbit/s. According to the so-called Digi-Cipher method (Jerrold A. Heller & Woo H. Paik, General Instrument Corporation, U.S.A., "The Digi-Cipher HDTV Broadcast System" Montreux Record 1991; Dr Matthew Miller, Jerrold Communications, U.S.A., "Digital HDTV on Cable", Montreux Record 1991) it is possible for instance for base-band and channel coding to obtain a data reduction to a total of 19.43 Mbit/s; according to the DSC-HDTV method (Wayne C. Luplow and Pieter Fockens, Zenith Electronics Corporation, U.S.A., "The All-Digital Spectrum-Compatible HDTV System", Montreux Record 1991) it is possible to achieve a data rate of 21.5 Mbit/s; according to Dig. TV for SNG (M. Cominetti, S. Chucchi, A. Morello, B. Sacco, RAI, Telettra S.p.A., Italy, "An Experimental Digital TV System for Satellite News Gathering (SNG)", Montreux Record 1991) a data reduction rate of similar extent can be achieved.

SUMMARY OF THE INVENTION

It is an object of the present invention to provide a simple method according to which such data-reduced HDTV signals, which have been reduced to a data rate of less than or equal to 20 Mbit/s can be transmitted economically via broad-band communication links.

In a method of the present invention for transmitting digital HDTV signals, a transmitter side of a broadband transmission link is operated on a DSR method. The HDTV signal is either fed at a data rate of ≦20.48 Mbit/s, or is data-reduced to the data rate of ≦20.48 Mbit/s by a technique utilizing the psycho-optical phenomena of the human eye. This HDTV signal at this data rate is split into two data streams of ≦10.24 Mbit/s each of which are fed to an I/Q interface of a four PSK modulator of the DSR transmission link. These two data streams are transmitted to the I/Q output of a 4PSK demodulator of said DSR transmission link where they are further processed.

The method in accordance with the present invention makes use for transmission purposes of the so-called DSR technique (Digital Satellit Radio, Institut für Rundfunktechnik (IRT), "DRS Spezifikation des Hörfunk-Übertragungsverfahrens im TV-Sat"; "Neues von Rohde & Schwarz" No. 114, "Audio-Coder DCA für den digitalen Hörfunk"; "Neues von Rohde & Schwarz" No. 122, "Audio-Decoder DAA für digitale Tonübertragung", which is known for feeding radio receivers via satellite. The technique for this DSR method has in the meantime been perfected, and this DSR transmission method has long proven most satisfactory in the broadcasting art. The equipment required for this method has in the meantime become commercially available both at the transmitter and the receiver side. The transmission method according to the present invention for data-reduced HDTV signals may therefore be realized highly economically with already available equipment.

In the DSR broadcast transmission method common so far, up to 16 stereo signals are transmitted via a channel, and base-band coding is effected in accordance with the DS1 method (Digital Sound 1 Mbit/s; European Patent Application 0133697 and, respectively, "Neues von Rohde & Schwarz", No 114 summer 1986, pp 13–16, 16 such DS1-coded audio signals are fed to a DSR modulator such as the model SFP of Rohde & Schwarz. On the digital level of this DSR modulator signal, multiplexing is carried out into two data streams of 10.24 Mbit/s each. This so-called I/Q interface of the DSR modulator in accordance with the DSR Standard has the main frames A and B of 320 bit/32 kHz each, wherein 11 bit/32 kHz synchronous words, 1 bit/32 kHz for special services, the interlaced useful bits and 19 check bits/32 kHz for correction of two bit errors per each BCH block (63 bits) are provided in each main frame.

This I/Q interface of the DSR modulator (see data sheet for the model SFP of Rohde & Schwarz) is utilized for the method according to the present invention. This interface of 2×10.24 Mbit/s leads to the 4PSK modulator which is built into the DSR modulator and provides the actual satellite IF signal at 70 or 118 MHz (see specification of model SFP of Rohde & Schwarz). In the DSR modulator SFP of Rohde & Schwarz the I/Q interface is externally accessible via the plug-in bridges A and B. The thus produced DSR signal from the output of the 4PSK modulator may then be transmitted to the DSR receiver either through a satellite link, a coaxial or optical fiber cable, a known broadband cable distribution network (as described, for example, in PTTCH, Gemeinschafts-antennen-Zubringernetz, GAZ, Digitaler Hörfunk: Verteilung von DSR-Signalen über Breitbandverteilnetze), a radio link or any other known broadband communication link, and in the DSR receiver the HDTV signals are retrieved in a 4PSK demodulator and are made available at the I/Q interface thereof as output signals for further processing. It is also possible with the DSR transmission method and the existing commercially available equipment therefor to transmit data-reduced HDTV signals in highly economical fashion. For this purpose, it is merely necessary to reduce the HDTV signal available for transmission to a bit rate of $\leq 20.48$ Mbit/s, for which purpose the initially mentioned methods are available. Thereafter it is only necessary to split this data stream in two $\leq 10.24$ Mbit/s data streams and feed them to the I/Q interface of the DSR modulator at the transmitter side of the communication link and then to retrieve and further process these data streams from the corresponding I/Q interface between the 4PSK demodulator and the DSR decoder in the receiver on the other side of the communication link.

At the receiver end there are now available both DSR consumer receivers and professional equipment all of which are suited for the purpose of the present invention at the receiver end (digital audio conversion device DSRU plus digital audio receiver DSRE of Rohde & Schwarz or, respectively, consumer receivers DSR 100 of Grundig, FT 990 of Philips, ST900 AF of Telefunken or, respectively, variable-frequency receivers of Sony). These receivers use commercially available LSI chips for 4PSK demodulation and DSR decoding. The interface between the 4PSK demodulator and the DSR decoder again is the $2 \times 10.24$ Mbit/s interface, and a corresponding clock and sync signal is additionally available. Hence, this DSR transmission system is transparent, i.e. the input bit sequence fed to the 4PSK modulator corresponds to the output bit sequence read out at the 4PSK demodulator. The frame structure is freely selectable, for instance in accordance with the DSR frame.

As an example, the method according to the present invention permits immediate direct satellite reception of digital HDTV signals by means of a commercially available consumer-type satellite receiver with a parabolic reflector of up to 30 cm. Reception may be stationary or via a portable receiver device with an adjustable satellite antenna. The bit error rate via DSR typically is $1 \times 10^{-4}$ to $1 \times 10^{-5}$. Feeding into a broadband distribution network is also possible. The digital HDTV signal may, for instance, be transmitted in two cable channels, for instance in the channels S9 and S10 (160 to 174 MHz) or the channels S19 and S20 (186 to 300 MHz) of the known CATV network. Thereafter, these signals may be received by commercially available DSR consumer receivers of a variable frequency-type. The method in accordance with the present invention is also suited for feeding the video signals to a terrestrial digital TV transmitter network in accordance with the intended DAB network for broadcasting (Digital-Audio-Broadcasting, "Digital Audio Broadcasting" ITU COM-89 Geneva, October 1989). For this purpose, it is merely necessary to adapt the COFDM principle (Coded Orthogonal Frequency Division and Multiplexing) of this DAB system to the conditions of the television signal, and thereby the distribution of the digital HDTV signals to the individual transmitting stations of this terrestrial television transmitter network may also be effected in a simple and economical way. The digital HDTV channel, which in addition to the picture signal of course also comprises several audio channels based for example on the MUSICAM technique and associated ancillary information or test and check information, may also comprise a cipher for activating a descrambler at the receiver side so that the method according to the invention may also be used for pay TV. The HDTV receiver may also be provided in a multimedia environment such as described in Elektronik 3/1991, p. 3.

An alternative operation of established DSR for transmitting digital audio signals and the method according to the present invention for transmitting digital HDTV signals will be possible, too. By utilizing two DSR channels it is possible, for example, to transmit the HDTV video signals for three-dimensional television in upward-compatible fashion.

By utilizing the known DSR transmission system it is possible to use the method according to the present invention not only for transmitting digital HDTV signals but also for transmitting television signals which are generated according to the so-called VADIS method (IRT Colloquium Feb. 4, 91, Hr. Hoffmann, p. 4, "Beispiele von Projekten zur Entwicklung digitaler Fernsehsysteme"—Eureka Project VADIS—DigiCipher; Report of the third EBU/ETSI Joint Technical Committee (JTC) Meeting in Geneva on 11–12 Feb. 1991, item 5.7.VADIS) in MAC quality but with 16:9 format. In this way it would be possible, for example, to transmit two digital television signals data-reduced to 10 Mbit/s by the VADIS method via a DSR transmission link so that the DSR transmission technique also offers an economical advantage for these digital TV signals, the quality of which is comparable to MAC/16:9.

BRIEF DESCRIPTION OF THE DRAWINGS

Other objects, features and advantages of the invention, its organization, construction and operation will be best understood from the following detailed description taken in conjunction with the accompanying drawings.

FIG. 3 illustrates a modified embodiment of the receiver side.

DESCRIPTION OF THE PREFERRED EMBODIMENTS

Figure 1:
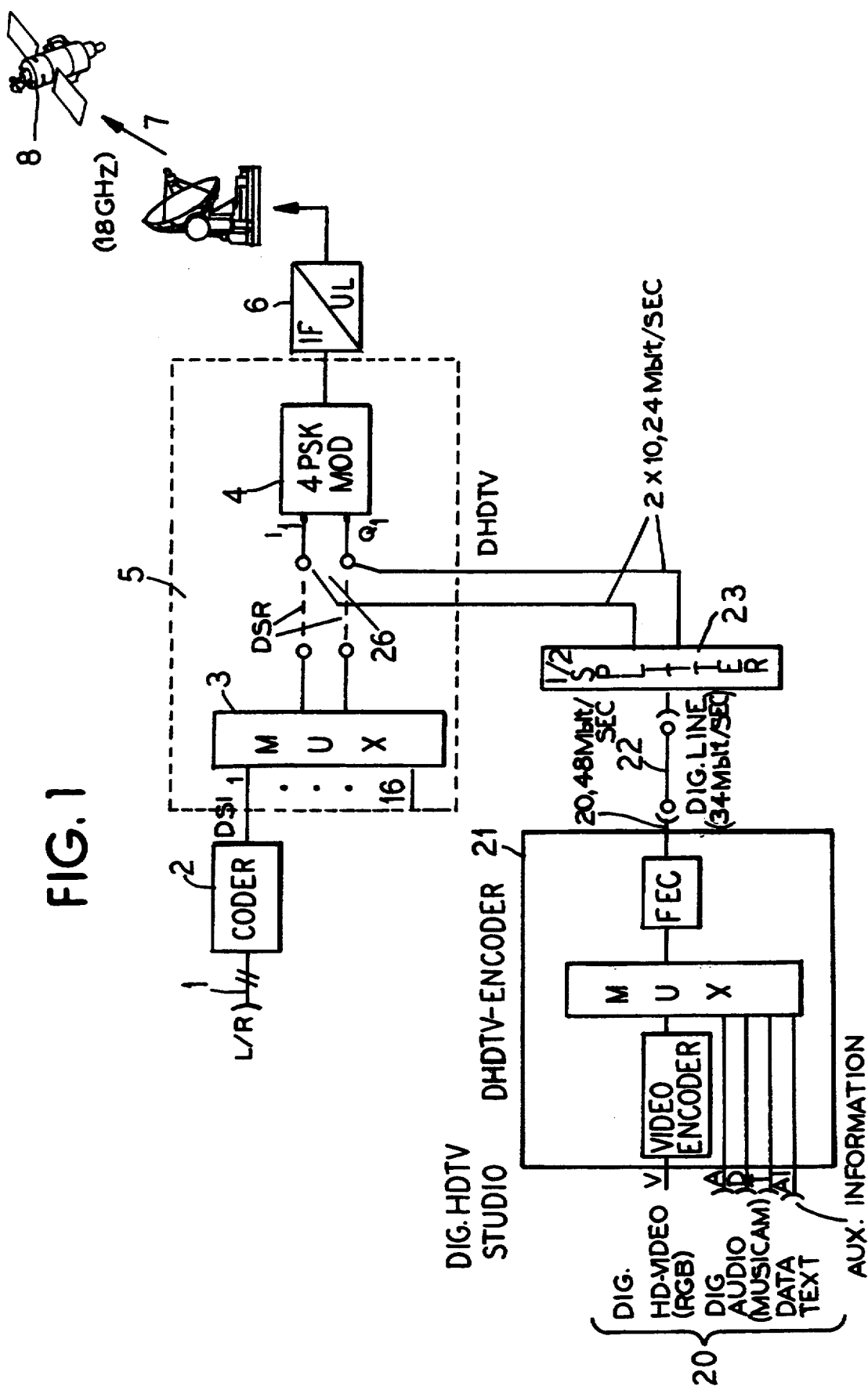
FIG. 1 illustrates the transmitter-side portion of a communication link for digital broadcasting via satellite with additional equipment in accordance with the invention for transmitting digital HDTV signals.
Figure 2:
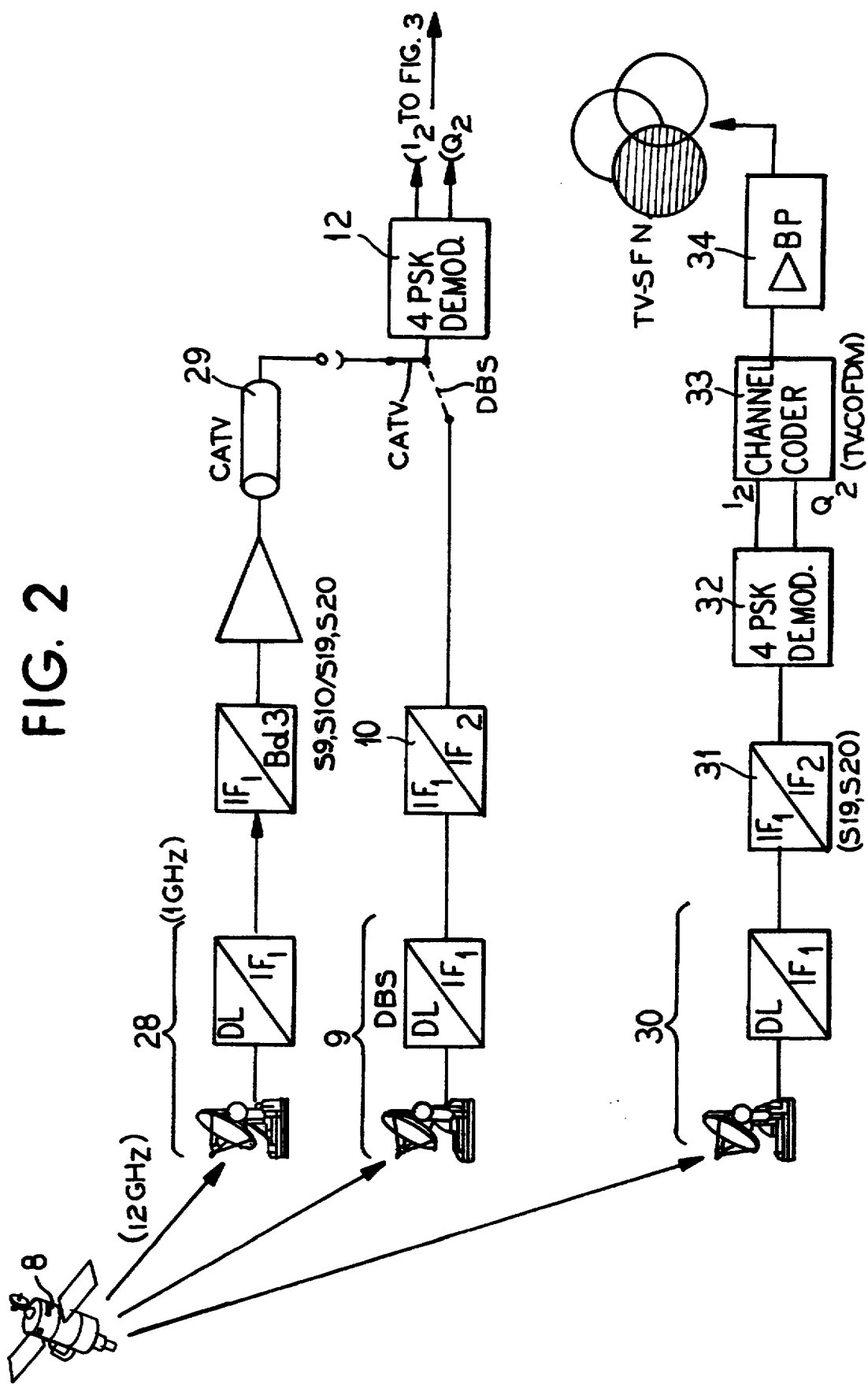
FIG. 2 illustrates the receiver side of the specified transmission link.

FIGS. 1 and 2 show the basic structure of a digital broadcasting communication link via satellites as described, for instance, in "Neues von Rohde & Schwarz", No. 114, summer 1986, p. 14. As will be apparent from FIG. 1, the stereo audio signal 1 to be transmitted is transmitted at the transmitter side in a DS1 coder 2 under the DS1-standard in a DS1-signal. 16 DS1-signals of this kind are fed to a DSR multiplexer 3 having its output coupled via a $I_1/Q_1$ interface to a 4PSK modulator 4. The multiplexer 3 and the 4PSK modulator are part of a DSR modulator such as the model SFP of Rohde & Schwarz (described in detail in the data sheet SFP of Rohde & Schwarz). The DSR output signals from the 4PSK modulator 4 are fed via a converter 6 to the satellite antenna 7 which transmits for instance at 18 GHz to the satellite 8 which in its turn transmits, for example, at 12 GHz. According to FIG. 2, the satellite signal is received at the receiver side via the outdoor unit 9 of the satellite reception system, and after frequency conversion in frequency converter 10 is fed to a DSR receiver the input side of which is provided with a 4PSK demodulator 12, the $I_2/Q_2$ interface outputs of which are coupled according to FIG. 3 to a DSR decoder 13 which in its turn is coupled via two D/A converters 14 to the loudspeakers 15 of the receiver. The DSR receiver may be composed of the digital audio converter DSRU and the digital audio receiver DSRE of Rohde & Schwarz, both incorporated herein, or it may be one of the afore-mentioned commercially available consumer DSR receivers of the kind marketed for satellite audio reception.

This technically perfected known DSR transmission system for audio signals as illustrated in FIGS. 1, 2 and 3 is used in accordance with the present invention for the transmission of digital HDTV signals. For this purpose, it is merely necessary that the digital HDTV signal 20 supplied by the television studio is reduced via a coder 21 in accordance with any of the above-mentioned known methods or improved future methods for data reduction, in which the psycho-optical phenomena of the human eye are utilized, to a data rate including channel coding of not more than 20.48 Mbit/s. This data reduction is preferentially already effected in the television studio so that an ordinary 34 Mbit/s transmission line 22 to the actual satellite earth station will suffice for the transmission of this data-reduced signal. There, the data-reduced HDTV signal is split via a splitter 23 into two data streams of $\leq 10.24$ Mbit/s each and is directly fed to the interface $I_1/Q_1$ of the 4PSK modulator 4 instead of the audio signals from the multiplexer 3, so that it will be transmitted to the DSR receiver in accordance with the DSR method developed for the transmission of audio signals. At the $I_2/Q_2$ interface output of the 4PSK demodulator 12 of said receiver, these two $\leq 10.24$ Mbit/s data streams may then be retrieved and further processed as HDTV signals. In the illustrated embodiment according to FIG. 3, the data streams at the outputs $I_2/Q_2$ are fed to a digital HDTV decoder 24 for converting the two data streams of $\leq 10.24$ Mbit/s each either to a corresponding analog television signal suited for immediate reproduction in an analog TV receiver 25, or the decoder 24 converts the digital signals to such a digital HDTV signal which can directly be processed via a digital TV receiver 25. In either case the TV receiver 25 is suited for a 16:9 format and for high-definition television, i.e. for maximum picture quality.

The alteration switch is provided so as to permit at the receiver side an alternative DSR digital audio/digital HDTV television operation with a single DSR receiver so that one and the same DSR receiver equipment may selectively be used for digital audio transmission or for digital HDTV signal transmission.

Instead of a satellite and/or cable communication link between DRS multiplexer/modulator 5 and receiver it is also possible to use any other known broadband transmission link such as a radio link or an optical fiber cable. By way of the receiver station 28 it is indicated in FIG. 2 how the DSR signals may be distributed to the receivers via a broadband cable network 29.

Finally, the satellite antenna 30 illustrates a further possible application of the method in accordance with the present invention; the signals received by the satellite 8 are fed after frequency conversion 31 to a 4PSK demodulator 32 which corresponds to the demodulator 12 of the receiver. The $I_2/Q_2$ outputs of the demodulator interface are directly connected to the input of a channel coder 33 which may basically be of analog design, like a COFDM modulator of the known DAB system. This coder 33 converts the data-reduced HDTV signals to a digital television signal which is immediately suited for selection of a terrestrial television transmitter 34 that forms part of a country-wide terrestrial TV transmitter network. In this way, the method according to the present invention may also be used for transmitting digital HDTV signals to the various transmitters of such a transmitter network.

Although I have described my invention by reference to particular illustrative embodiments thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim as my invention:

1. A method of transmitting a digital HDTV signal, comprising the steps of:
    providing a broadband transmission link which operates on a DSR method and which has a transmitter side and a receiver side;
    feeding the HDTV signal at a data rate of $\leq 20.48$ Mbit/s;
    splitting the HDTV signal into two data streams of $\leq 10.24$ Mbit/s each, and at the transmitter side feeding the two data streams to an I/Q interface of a 4PSK modulator of the DSR broadband transmission link; and
    transmitting the two data streams to an I/Q output of a 4PSK demodulator at the receiver side of the DSR transmission link where they are further processed.

2. A method according to claim 1 including the step of feeding the two data streams of $\leq 10.24$ Mbit/s each at said I/Q output of the 4PSK demodulator to an HDTV decoder in which they are converted to a digital or analog television signal suitable for use in a digital or analog TV receiver.

3. A method according to claim 1 including the step of providing a corresponding re-encoding of the two data streams at said I/Q output of said 4PSK demodulator, and then feeding them to a modulator input of a TV transmitter of a terrestrial TV transmitter network.

4. A method according to claim 1 including the step of providing the broadband transmission link as a satellite link.

5. A method according to claim 1 including the step of providing the broadband transmission link as a coaxial cable transmission link.

6. A method of transmitting digital television signals, comprising the steps of:
    providing two data-reduced digital television signals each having a data rate of $\leq 10.24$ Mbit/s;
    feeding said two data-reduced digital television signals to an I/Q interface of a 4PSK modulator at a transmitter side of a DSR broadband transmission link; and
    transmitting the two television signals to an I/Q output of a 4PSK demodulator at a receiver side of said DSR transmission link.

7. A method according to claim 6 including the step of providing the broadband transmission link as a satellite link.

8. A method according to claim 6 including the step of providing the broadband transmission link as a coaxial cable transmission link.

* * * * *